US007996571B2

(12) United States Patent
Salokannel

(10) Patent No.: US 7,996,571 B2
(45) Date of Patent: Aug. 9, 2011

(54) WIRELESS COORDINATION OF APPARATUS INTERACTION

(75) Inventor: Juha Salokannel, Tampere (FI)

(73) Assignee: Nokia Corporation, Espoo (FI)

( * ) Notice: Subject to any disclaimer, the term of this patent is extended or adjusted under 35 U.S.C. 154(b) by 313 days.

(21) Appl. No.: 12/181,132

(22) Filed: Jul. 28, 2008

(65) Prior Publication Data

US 2009/0248913 A1 Oct. 1, 2009

Related U.S. Application Data

(60) Provisional application No. 61/039,417, filed on Mar. 25, 2008.

(51) Int. Cl.
*G06F 13/00* (2006.01)
*H04M 1/38* (2006.01)
(52) U.S. Cl. ............................................ 710/3; 455/567
(58) Field of Classification Search .................... 710/33; 455/567
See application file for complete search history.

(56) References Cited

U.S. PATENT DOCUMENTS

| 7,272,412 | B2* | 9/2007 | Adamson | 455/552.1 |
|---|---|---|---|---|
| 7,548,875 | B2* | 6/2009 | Mikkelsen et al. | 705/26.8 |
| 7,783,729 | B1* | 8/2010 | Macaluso | 709/220 |
| 2002/0013869 | A1* | 1/2002 | Taniguchi et al. | 710/33 |
| 2002/0085511 | A1* | 7/2002 | Koponen et al. | 370/315 |
| 2002/0115478 | A1* | 8/2002 | Fujisawa et al. | 455/567 |
| 2006/0004834 | A1* | 1/2006 | Pyhalammi et al. | 707/102 |
| 2007/0026958 | A1* | 2/2007 | Barasch et al. | 473/266 |

* cited by examiner

*Primary Examiner* — Henry W Tsai
*Assistant Examiner* — Hyun Nam
(74) *Attorney, Agent, or Firm* — Locke Lord Bissell & Liddell

(57) ABSTRACT

A system for implementing wireless control between apparatuses. In at least one scenario, an apparatus may, after an event (e.g., receiving wireless communication), create a wireless message based on the event, and may then send the wireless message to a peripheral apparatus. The peripheral apparatus may utilize some or all of the message data to formulate and display a user interface. Inputs (e.g., soft-coded or hardware based buttons) in the peripheral device may be actuated in accordance with the user interface, which may result in a response message being sent to the apparatus. The response message may, in turn, trigger functionality in the apparatus.

29 Claims, 14 Drawing Sheets

FIG. 5B

Existing ULP Packet Structures

550

| Header | | | Length | | Payload | | |
|---|---|---|---|---|---|---|---|
| LSB | | MSB | LSB | MSB | LSB | | MSB |
| Type (3 bits) | AAdd (1 bit) | RFU (4 bits) | Len (6 bits) | RFU (2 bits) | AdvA (48 bits) | | Data (0-31 octets) |

*ADV_IND packet PDU*

552

| Header | | | | Length | | Payload | |
|---|---|---|---|---|---|---|---|
| LSB | | | MSB | LSB | MSB | LSB | MSB |
| Type (3 bits) | SAdd (1 bit) | AAdd (1 bit) | RFU (3 bits) | Len (6 bits) | RFU (2 bits) | ScanA (48 bits) | AdvA (48 bits) |

*SCAN_REQ packet PDU*

554

| Header | | | Length | | Payload | |
|---|---|---|---|---|---|---|
| LSB | | MSB | LSB | MSB | LSB | MSB |
| Type (3 bits) | AAdd (1 bit) | RFU (4 bits) | Len (6 bits) | RFU (2 bits) | Scan response (9-39 octets) | |

*SCAN_RSP packet PDU*

556

| LSB | | | MSB | LSB | | MSB |
|---|---|---|---|---|---|---|
| AdvA (48 bits) | ProfileID (16 bits) | MoreProf (1 bit) | EncReq (1 bit) | RFU (6 bits) | AdvName (0-30 octets) | |

*SCAN_RSP packet's Payload structure (Scan response)*

558

| Header | | | Length | | Payload | | |
|---|---|---|---|---|---|---|---|
| LSB | | MSB | LSB | MSB | LSB | | MSB |
| Type (3 bits) | AAdd (1 bit) | RFU (4 bits) | Len (6 bits) | RFU (2 bits) | AdvA (48 bits) | | Data (0-31 octets) |

*ADV_NONCONN_IND packet PDU*

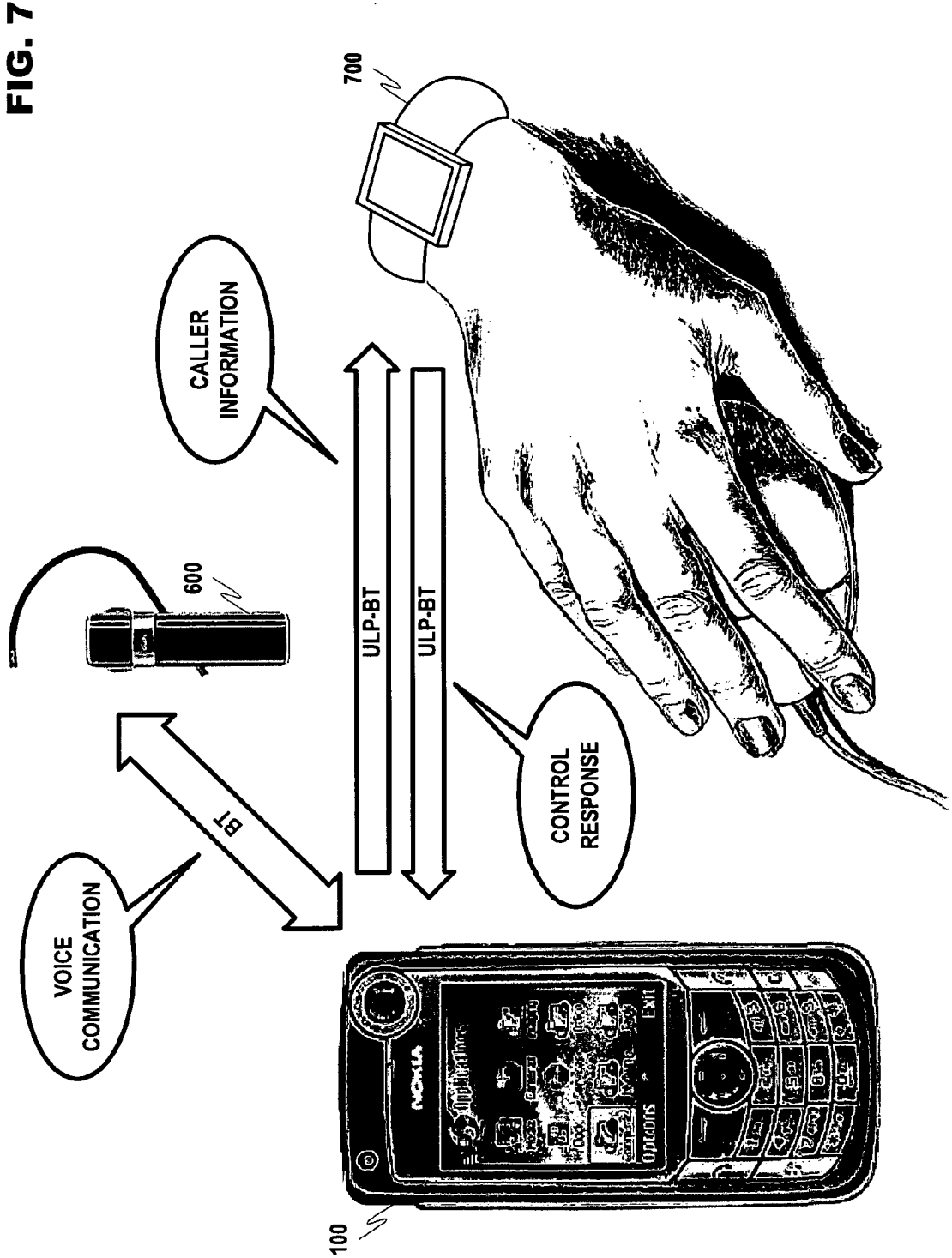

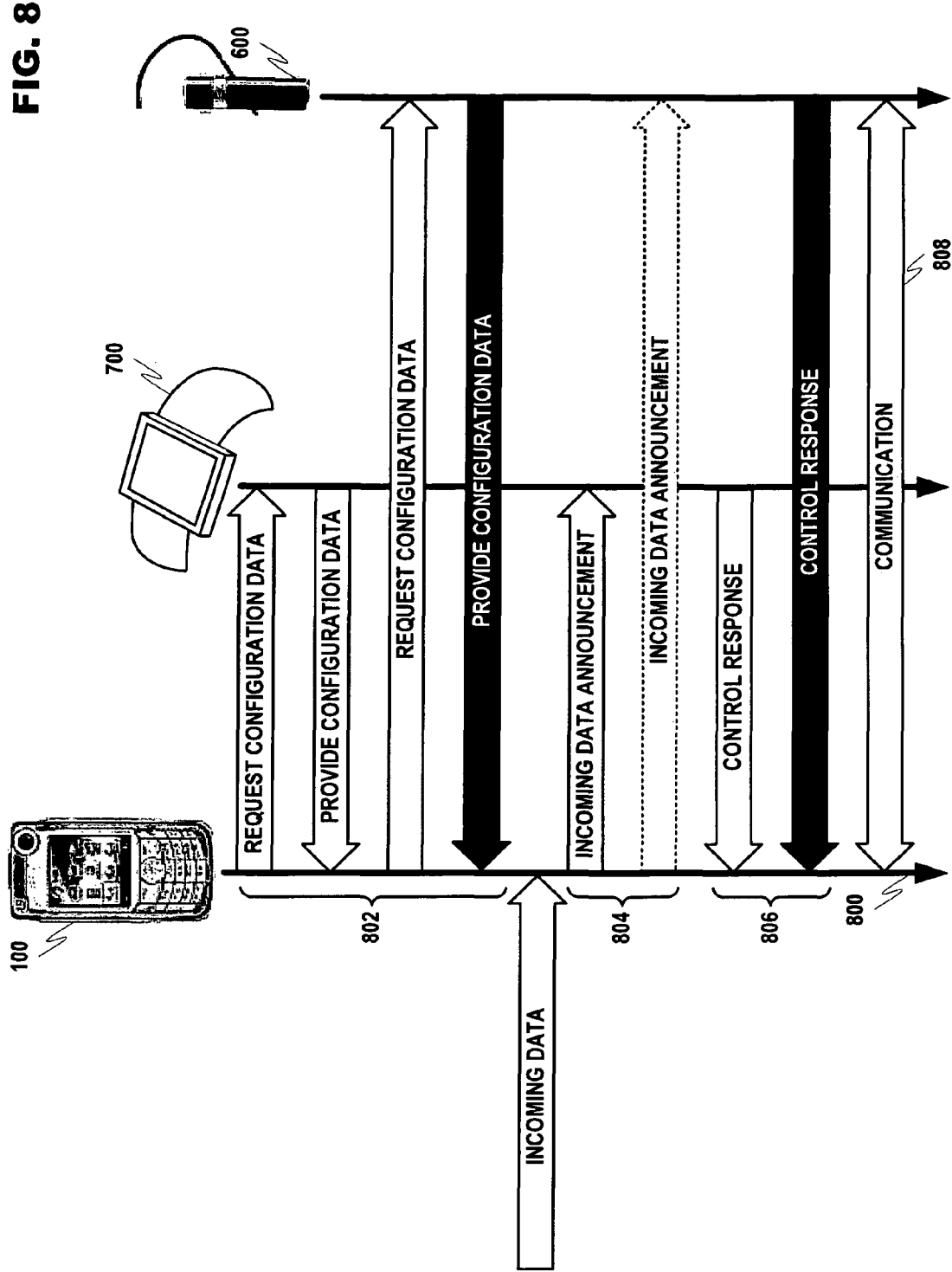

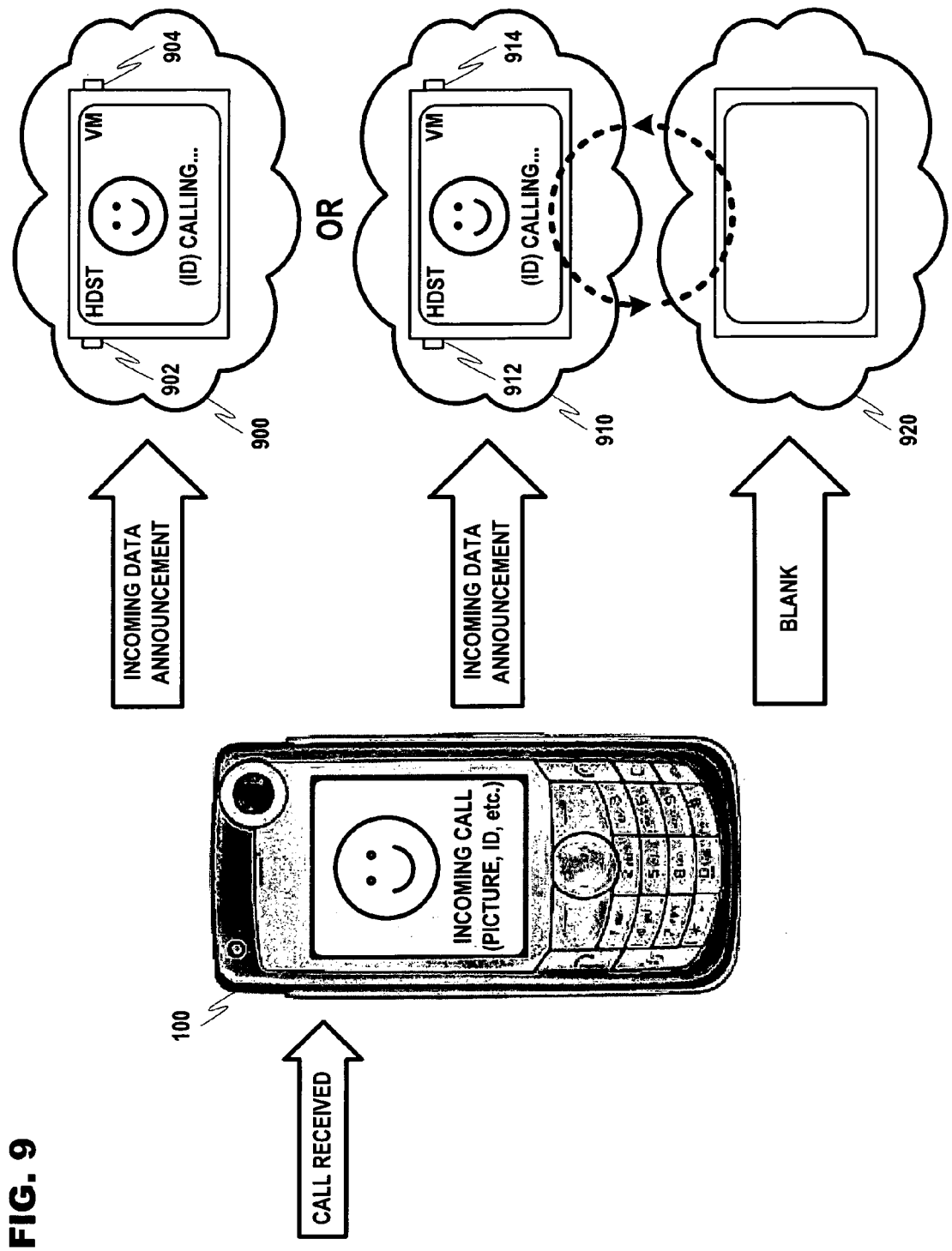

WIRELESS COORDINATION OF APPARATUS INTERACTION

PRIORITY

The present application claims priority to U.S. provisional patent application 61/039,417, entitled "WIRELESS COORDINATION OF APPARATUS INTERACTION" filed on Mar. 25, 2008, the aforementioned provisional application being incorporated in entirety herein by reference.

BACKGROUND

1. Field of Invention

Various embodiments of the present invention relate to coordinating wireless apparatus operation, and more specifically, to a system that may coordinate apparatus operation through user interface features provided in a wireless apparatus that may be resource constrained.

2. Background

Wireless apparatuses have become prevalent in today's society. This popularity may, at least in part, be fueled by rapid technological development in the area of multifunction wireless communication apparatuses (WCD). Consumers may now replace common standalone productivity apparatuses like computers, laptops, facsimile machines, personal digital assistants, etc. with a solitary apparatus capable of performing all of these functions. Apparatuses with these abilities have been embraced by business people who often find that work can now be completed during time that was previously wasted (commutes to and from work, home, etc.)

However, while a WCD may be empowered with many beneficial features, the small size and power constraints of these apparatuses may also create a hindrance for the user. The operator interfaces installed in these apparatuses are often small, and therefore, may not be conducive to high throughput. As a result, users may rely on peripheral input apparatuses such as keyboards, mice, headsets, etc. in order to perform their work. Further, the small size of many apparatuses today also implies that there is a lack of physical connections to connect wired apparatuses. Therefore, a WCD should not only be able to support wireless communications with one peripheral apparatus, but it should also be able to support connections with multiple peripheral apparatuses being operated concurrently.

Peripheral apparatuses may be conveniently located during times when a primary communication apparatus may not be accessible. For example, a wristwatch may be worn upon a person's wrist while a WCD may reside in a person's pocket, purse, briefcase, etc. However, peripheral apparatuses may only provide limited processing, power, etc., and therefore, it may be difficult under current architectures and/or strategies to construct such apparatuses without extremely small and efficient componentry and compact software. These requirements may, in turn, make the cost of constructing such a wireless peripheral control apparatus prohibitive.

SUMMARY

Various example embodiments of the present invention may be directed to at least a method, apparatus, computer program and system for implementing wireless control between apparatuses. In at least one scenario, an apparatus may, after an event (e.g., receiving wireless communication), create a wireless message based on the event, and may then send the wireless message to a peripheral apparatus. The peripheral apparatus may utilize some or all of the message data to formulate and display a user interface. Inputs (e.g., soft-coded or hardware-based buttons) in the peripheral device may be actuated in accordance with the user interface, which may result in a response message being sent to the apparatus. The response message may, in turn, trigger functionality in the apparatus.

For example, an apparatus may receive wireless communication from another apparatus (e.g., a wireless communication device, an access point, etc.). The apparatus may utilize information based on the received wireless communication to formulate a message containing user interface information that can be displayed on a peripheral apparatus. In at least one embodiment of the present invention, the peripheral apparatus may be a resource-constrained device (e.g., a wristwatch). Therefore, the formatting of the message may be such that data contained in the message may be used to formulate and display user interface information on a peripheral device without requiring excessive processing. The information in this message may include text, image or instruction data. In various example embodiments of the present invention, user interface information displayed on peripheral apparatuses may be configured to blink, the blinking activity being driven internally or externally (via wireless communication).

The image information may be in a simple format (e.g., pixel format) that may be displayed on a resource constrained apparatus (possibly along with the text information) without the need for excessive processing. Also, the instruction information may configure an interface in the peripheral device (e.g., soft-coded or hardware-based button) so that actuation of inputs defined in the interface result in a wireless response message being sent to the apparatus. The response message may include text/image information identifying the command, the selected input, etc. The apparatus may execute an activity corresponding to the control response, which may include, for example, establishing wireless links or other communication-related processes.

The embodiments described above are intended only as non-limiting examples, and therefore, elements of each embodiment may also correspond to the other embodiments.

DESCRIPTION OF DRAWINGS

The invention may be further understood from the following detailed description of various example embodiments, taken in conjunction with appended drawings, in which:

FIG. 7 discloses an example wireless apparatus coordination arrangement in accordance with at least one embodiment of the present invention.

FIG. 8 discloses an example communication progression in accordance with at least one embodiment of the present invention.

FIG. 9 discloses example user interfaces that may be implemented on an apparatus in accordance with at least one embodiment of the present invention.

DESCRIPTION OF EXAMPLE EMBODIMENTS

While the present invention has been described below in terms of multiple example embodiments, various changes can be made therein without departing from the spirit and scope of the invention, as described in the appended claims.

I. Wireless Communication Device

As previously set forth, the present invention, in accordance with at least one embodiment, may be implemented utilizing a variety of apparatuses. Therefore, establishing an understanding of wirelessly-enabled apparatuses that may be used in implementing these various example embodiments may aid in comprehending the following disclosure. For example, in the case of a cellular handset, palmtop or laptop computer, wireless communicator or other handheld wireless apparatus, the integrated data handling capabilities of the apparatus may play an important role in facilitating transactions between the transmitting and receiving apparatuses.

Figure 1A:
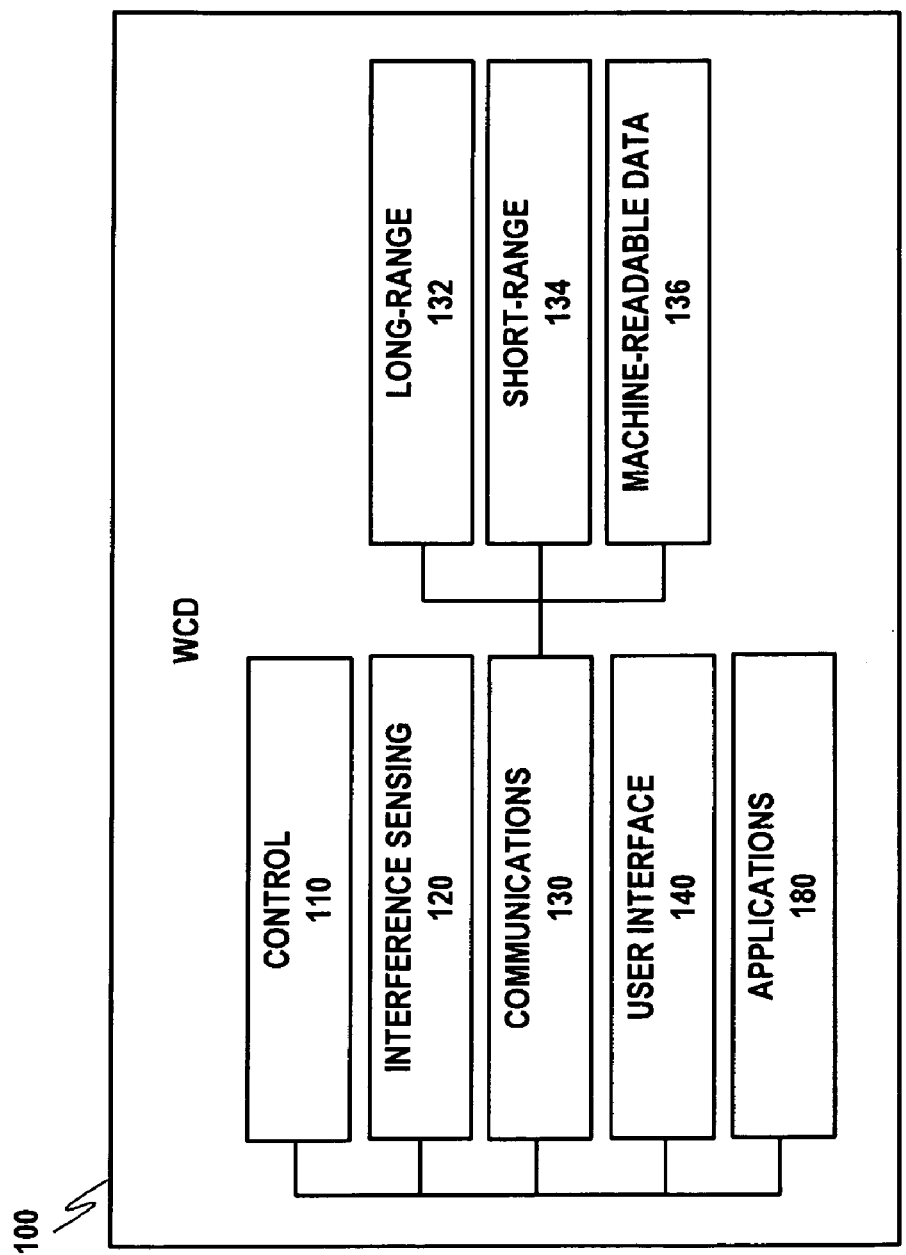
FIG. 1A discloses a modular description of an example wireless communication device usable with at least one embodiment of the present invention.

FIG. 1A discloses an example modular layout for a wireless communication device usable with various example embodiments of the present invention. WCD 100 may be represented as an organization functional modules corresponding to the various operational aspects/elements of the apparatus. These functional modules may be implemented by various combinations of software and/or hardware components as previously discussed below.

Control module 110 may regulate the operation of the apparatus. Inputs into control module 110 may be received from various other modules included within WCD 100. For example, interference sensing module 120 may use various techniques known in the art to sense sources of environmental interference within transmission range of WCD 100. Control module 110 may interpret these inputs, and in response, may issue control commands to other modules.

Communications module 130 may generally incorporate all of the wired and/or wireless communication features of WCD 100. As shown in FIG. 1A, communications module 130 may include, for example, long-range communication module 132, short-range communication module 134 and machine-readable data module 136 (e.g., for NFC). Communications module 130 may utilizes at least these sub-modules to receive a multitude of different types of communication from both local and long distance sources, and to transmit data to apparatuses within the transmission range of WCD 100. Communications module 130 may be triggered by control module 110, or by control resources local to the module responding to sensed messages, environmental influences and/or other apparatuses in proximity of WCD 100.

User interface module 140 includes visual, audible and tactile elements which allow a user to receive data from, and enter data into, the apparatus. The data entered by a user may be interpreted by control module 110 to affect the behavior of WCD 100. User-inputted data may also be transmitted by communications module 130 to other apparatuses within transmission range (e.g., for wireless communication). Conversely, other apparatuses may also send information to WCD 100 via communications module 130, and control module 110 may cause this information to be transferred to user interface module 140 for presentment to the user.

Applications module 180 may incorporate all other hardware and/or software resources on WCD 100. Applications in this module may include sensors, interfaces, utilities, interpreters, data applications, or any other functionality executable on WCD 100. Applications within application module 180 may be invoked by control module 110 to, for example, read information provided by various modules and in turn supply information to requesting modules.

Figure 1B:
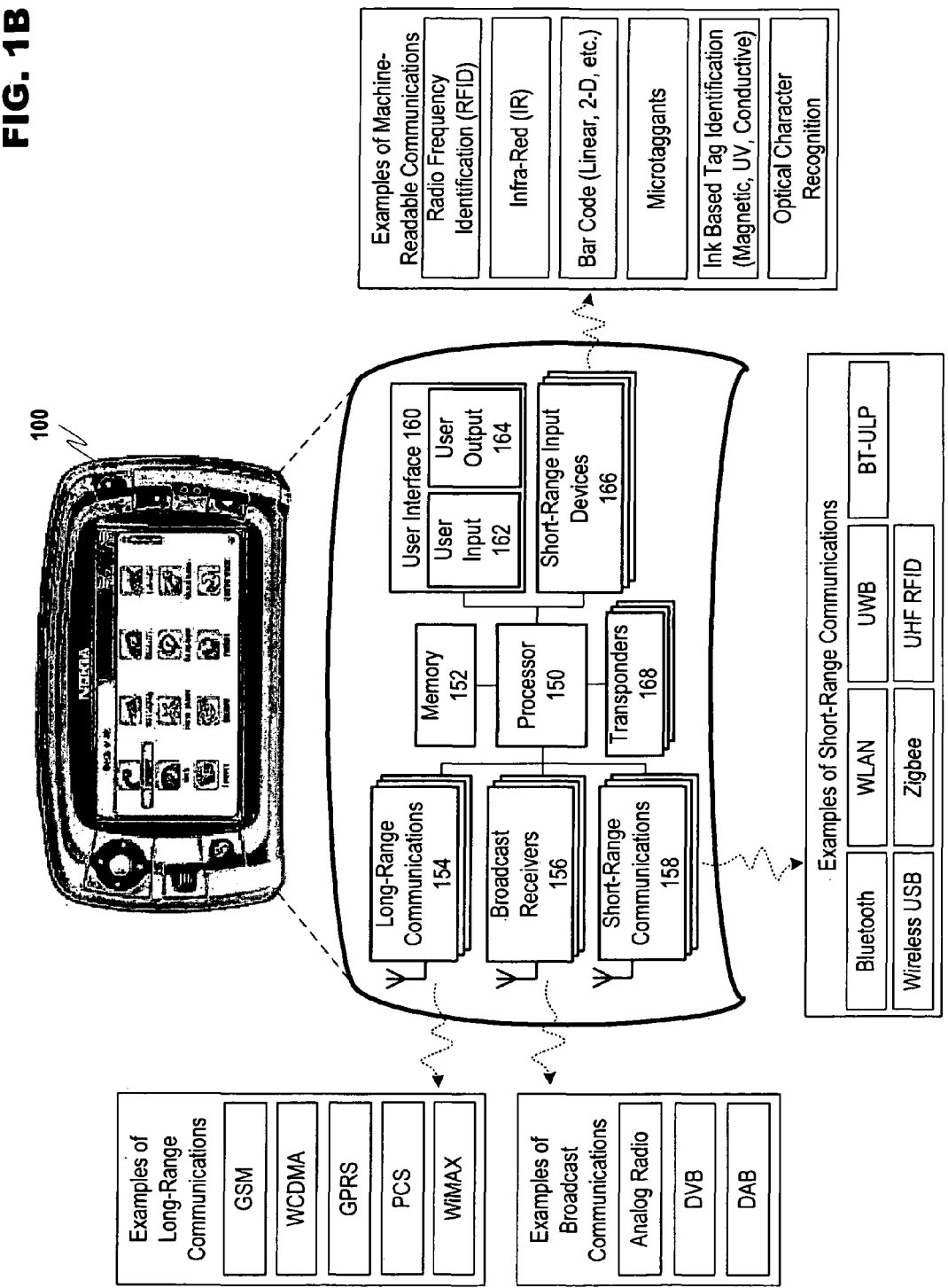
FIG. 1B discloses an example structural description of the wireless communication device previously described in FIG. 1A.

FIG. 1B discloses an example structural layout for WCD 100 according to an embodiment of the present invention that may be used to implement the functionality of the modular system previously described with respect to FIG. 1A. Processor 150 may control overall apparatus operation, for example, by interfacing with other elements in WCD 100, like communication sections 154, 158 and 166. Processor 150 can be implemented with one or more microprocessors that are each capable of executing software instructions stored in memory 152.

Memory 152 may include fixed and/or removable memory media (e.g., magnetic, optical, etc.) that may comprise, for example, random access memory (RAM), read only memory (ROM), rewritable solid state memory like flash, etc. Memory 152 may store information in the form of data and software components (also referred to herein as modules). The data stored by memory 152 may be associated with particular control, application or database modules such as command databases, contacts databases or business databases for scheduling, email, etc.

The software components stored by memory 152 may include computer-readable instructions that can be executed by processor 150. Various types of software components may be stored in memory 152. For instance, memory 152 may store software components that control communication sections 154, 158 and 166. Memory 152 may also store software components related to operating system components, user interfaces, applications, utilities, security, entertainment and any communication utilities modules required to support WCD 100.

Long-range communications 154 may perform activities related to the exchange of information over large geographic areas (such as cellular network communication). These long-range network technologies have traditionally been classified by generations, starting in the late 1970s to early 1980s with first generation (1G) analog cellular telephones that provided baseline voice communication, to modern digital cellular telephones. Global System for Mobile Communications (GSM) is an example of a widely employed 2G digital cellular network communicating in the 900 MHZ/1.8 GHZ bands in Europe and at 850 MHz and 1.9 GHZ in the United States. In addition to voice functionality (e.g., via GSM), long-range communications 154 may operate to establish wireless data communication sessions, such as General Message Radio Service (GPRS) sessions and/or Universal Mobile Telecommunications System (UMTS) sessions. Long-range communications 154 may also operate to transmit and receive text messages, such as via the short messaging service (SMS), and/or multimedia content via multimedia messaging service (MMS) messages.

As a subset of long-range communications 154, or alternatively operating as an independent module separately coupled to processor 150, broadcast receivers 156 allows WCD 100 to receive unsolicited wireless communication via mediums such as Digital Video Broadcast for Handheld Apparatuses (DVB-H). Transmissions may be encoded so that only certain apparatuses may access transmission content, and may contain text, audio or video information. In at least one example, WCD 100 may receive broadcasts and/or information within the broadcast signal to determine if the apparatus is permitted to view the received content.

Short-range communications 158 may support the exchange of information across short-range wireless networks. As described above and depicted in FIG. 1B, examples of such short-range communications 158 are not limited to Bluetooth™, Ultra Low Power Bluetooth™ (ULP-BT), Wireless Local Area Network (WLAN), Ultra-Wide Band (UWB) and Wireless Universal Serial Bus (WUSB) connections. Short-range communications 158 may perform functions related to the establishment of short-range connections, as well as processing related to the transmission and reception of information via such example connections.

Short-range input device 166, also depicted in FIG. 1B, may provide functionality related to the short-range scanning of machine-readable data (e.g., Near Field Communication (NFC)). For example, processor 150 may control short-range input device 166 to generate Radio Frequency (RF) scanning signals for activating a Radio Frequency Identification (RFID) transponder, and may in turn control the reception of signals from an active transponder. Other short-range scanning methods for reading machine-readable data that may be supported by short-range input apparatus 166 are not limited to Infra-Red (IR) communication, linear and 2-D (e.g., Quick Response (QR)) bar code readers (including processes related to interpreting universal product codes (UPC) labels), and optical character recognition devices for reading magnetic, Ultraviolet (UV), conductive or other types of coded data that may be provided in a tag using suitable ink. In order for short-range input apparatus 166 to scan the aforementioned types of machine-readable data, the input device may include optical detectors, magnetic detectors, Charge Coupled Devices (CCDs) or other sensors known in the art for interpreting machine-readable information.

As further shown in FIG. 1B, user interface 160 may also be coupled to processor 150. User interface 160 may facilitate the exchange of information with a user of an apparatus. User interface 160, as shown, may include user input 162 and user output 164. User input 162 may include one or more components that allow a user to input data into WCD 100. Examples of such components include keypads, touch screens, microphones, etc. User output 164 may allow a user to obtain information from WCD 100. Thus, user output portion 164 may include various components, such as a display, Light Emitting Diodes (LED), tactile emitters, audio speakers, etc. Example displays may include Liquid Crystal Displays (LCDs) and other types of video displays.

WCD 100 may also include one or more transponders 168. A transponder may be an essentially passive apparatus that may be programmed by processor 150 with information to be delivered in response to a scan from an outside source. For example, an RFID scanner mounted in an entryway may continuously emit radio frequency waves. When an apparatus containing transponder 168 passes through the entryway, the transponder may be energized and may respond with information identifying the apparatus, person, security information (e.g., security codes), etc. In addition, a reader may be mounted (e.g., as discussed above with regard to examples of short-range input device 166) in WCD 100 so that it can read information from other transponders in the vicinity.

Hardware corresponding to communications sections 154, 156, 158 and 166 provide for the transmission and reception of signals. Accordingly, these sections may include components (e.g., electronics) that perform functions such as modulation, demodulation, amplification, and filtering. These sections may be locally controlled, or may be controlled by processor 150 in accordance with software communication components stored in memory 152.

The elements shown in FIG. 1B may be constituted and coupled according to various techniques in order to produce the functionality described in FIG. 1A. One such technique involves coupling separate hardware components corresponding to processor 150, communications sections 154, 156 and 158, memory 152, short-range input device 166, user interface 160, transponder 168, etc. through one or more wired or wireless bus interfaces. Alternatively, any and/or all of the individual components may be replaced by an integrated circuit in the form of a programmable logic apparatus, gate array, ASIC, multi-chip module, etc. programmed to replicate the functions of the stand-alone components. Each of these components may be coupled to a power source, such as a removable and/or rechargeable battery (not shown).

During example apparatus operation, user interface 160 may interact with one or more communication software components (e.g., stored in memory 152) that may provide for the establishment of communication service sessions using long-range communications 154 and/or short-range communications 158. The communication utility software components may include various routines that allow for the transmission and reception of information and services from remote apparatuses according to mediums such as the Wireless Application Medium (WAP), Hypertext Markup Language (HTML) variants like Compact HTML (CHTML), etc.

II. Wireless Communication Mediums

In accordance with at least one example embodiment, the present invention may be implemented with a short-range wireless communication medium. Bluetooth™ is an example of a commonly employed short-range wireless technology. A Bluetooth™-enabled WCD may transmit and receive data, for example, at a rate of 720 Kbps within a range of 10 meters, and may transmit up to 100 meters with additional power boosting. Current Bluetooth™-enabled apparatuses may operate at a nominal rate of 1 Mbps. A user does not have to actively instigate a Bluetooth™ network. Instead, a plurality of apparatuses within communication range of each other may automatically form a network group called a "piconet". Any apparatus may promote itself to be the master of the piconet, allowing it to manage data exchanges between up to seven "active" slaves and 255 "parked" slaves. Active slaves may exchange data based on the clock timing of the master. Parked slaves may monitor a beacon signal in order to stay synchronized with the master apparatus, and wait for one of the seven active slots to become available. The networked Bluetooth™ apparatuses may continually switch between active and power saving modes in order to conserve resources when not communicating with other piconet members. In addition to Bluetooth™ other popular short-range wireless networks include WLAN (of which "Wi-Fi" local access points communicating in accordance with the IEEE 802.11 standard, is an example), WUSB, UWB, ZigBee (802.15.4, 802.15.4a), Ultra Low Power Bluetooth™ (ULP-BT) and UHF RFID.

The present invention, in accordance with various example embodiments, may be implemented with any communication configuration enabled to operate in a manner similar to the above identified example communication mediums. While Ultra Low Power Bluetooth™ (ULP-BT) will be used for the sake of explanation in the following disclosure, as previously set forth, the following example embodiments of the present invention are not specifically limited to this wireless communication medium. ULP-BT is an open standard industry initiative that was initially called Wibree™ at its introduction, but has since been adopted by the Bluetooth™ Users Group for use in extending local connectivity to small apparatuses. ULP-BT may enable close range communication with Bluetooth™-like performance of 1 Mbps in the 0-10 meter range. ULP-BT may be optimal for installations requiring extremely low power consumption, small size and low cost. ULP-BT may be implemented either as stand-alone chip or as Bluetooth™ ULP-BT dual-mode chip.

Figure 2:
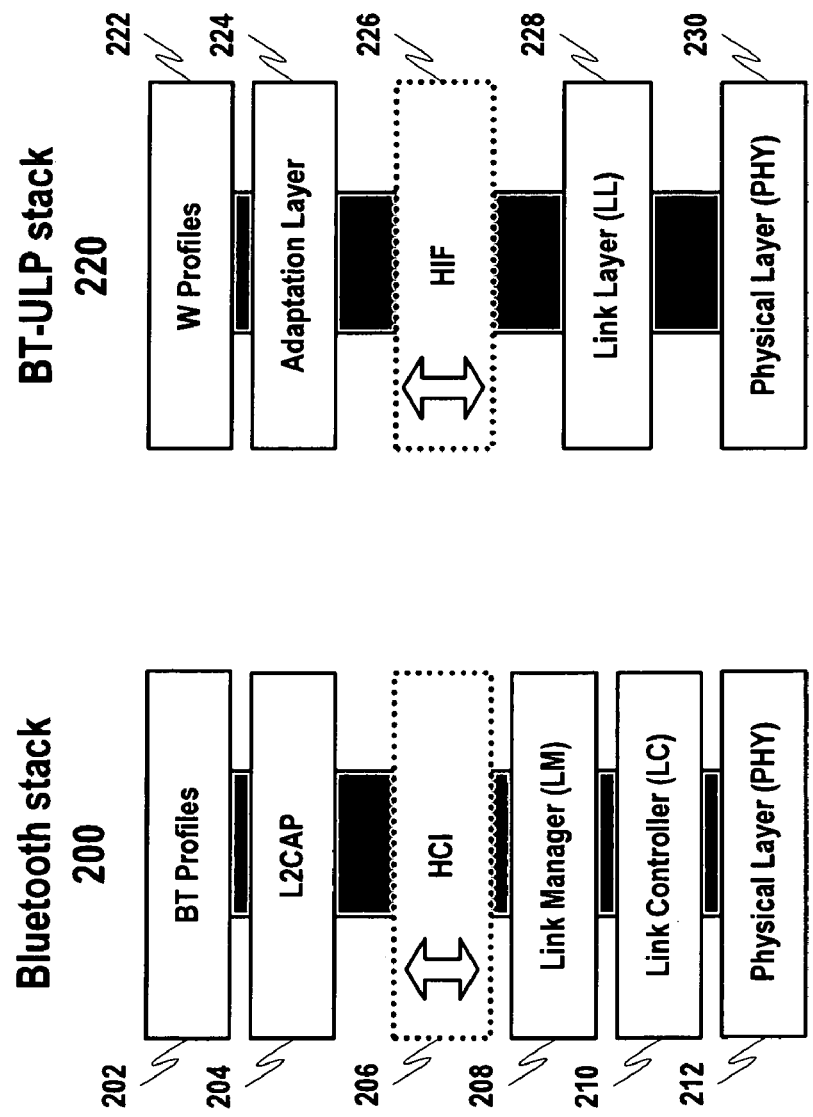
FIG. 2 discloses an example Bluetooth™ protocol stack and an Ultra Low Power Bluetooth™ protocol stack usable with at least one embodiment of the present invention.

Now referring to FIG. 2, an example Bluetooth™ protocol stack and an example ULP-BT protocol stack are shown. Bluetooth™ stack 200 may include elements that convey information from a system level to a physical layer where it may then be transmitted wirelessly to another apparatus. At the top level, BT Profiles 202 include at least a description of a known peripheral apparatuses that may be wirelessly coupled to WCD 100, or an application that may utilize Bluetooth™ in order to engage in wireless communication with a peripheral apparatus. The use of the phrase "peripheral apparatuses" is not intended to limit the scope of the present invention, and is used only to represent any apparatus external to WCD 100 that is also capable of wirelessly communicating with WCD 100. Bluetooth™ profiles corresponding to other apparatuses may be established, for example, through a pairing process wherein identification and connection information for a peripheral apparatus may be received by WCD 100 by polling the other apparatus. This information may then be saved in order to expedite the connection to the apparatus at a later time.

After the application and/or target peripheral apparatus (or apparatuses) have been established, any information to be sent must be prepared for transmission. L2CAP level 204 may include at least a logical link controller and adaptation protocol. This protocol may support higher level protocol multiplexing message segmentation and reassembly, and the conveying of quality of service information. The information prepared by L2CAP level 204 may then be passed to an application-optional host controller interface (HCI) 206. This layer may provide a command interface to the lower link manager protocol (LMP) layers, link manager (LM) 208 and link controller (LC) 210. LM 208 may establish the link setup, authentication, link configuration and other protocols related to establishing a wireless link between two or more apparatuses. Further, LC 210 may manage active links between two or more apparatuses by handling low-level baseband protocols. Wireless communication may then be established and conducted using hardware (modem, antenna, etc.) residing in physical layer (PHY) 212. Of course, the above identified layers of Bluetooth™ stack 200 may also be utilized in an order reversed from that disclosed above in order to receive a wireless transmission into WCD 100 from a peripheral apparatus.

The layers in the standalone ULP-BT stack 220 are similar to the elements previously described. However, due to the relative simplicity of ULP-BT when compared to Bluetooth™, there may actually be fewer layers utilized to achieve wireless communication. ULP-BT Profiles 222, similar to the profiles used in Bluetooth™, may specify applications that can use ULP-BT for communication, as well as peripheral apparatuses with which a ULP-BT modem may wirelessly communicate. An adaptation layer 224 may be used to prepare the information for transmission via wireless communication. Adaptation layer 224 may be, for example, a Profile Adaptation Layer (PAL) or an L2CAP similar to Bluetooth™, but configured for simplified and/or low-power operation. Host interface (HIF) layer 226 may provide an interface between the upper layers communicating with applications and schedulers in WCD 100, and the lower layers of the ULP-BT stack 220 which establish and maintain the links to peripheral apparatuses. Lower layers of the ULP-BT stack 220 may further include at least link layer (LL) 228. LL 228 may both establish and maintain wireless communications with other wireless enabled apparatuses through the use of Physical Layer (PHY) 230. However, LL 228 as shown in the ULP-BT stack may differ significantly from LM 208 and LC 210 in Bluetooth™.

III. Dual-Mode Modem

Figure 3A:
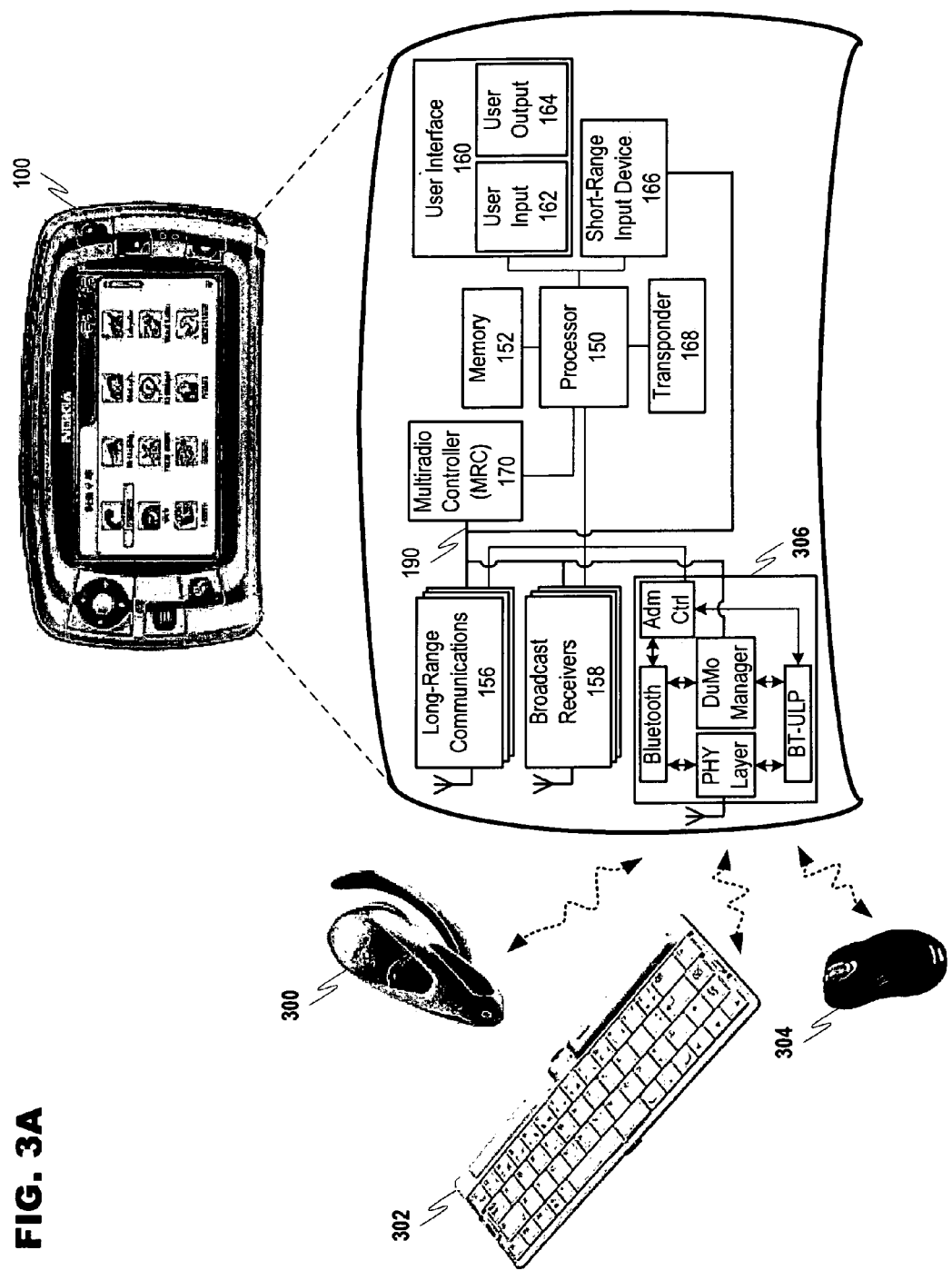
FIG. 3A discloses an example of multiple wireless peripheral apparatuses attempting to communicate concurrently with a dual-mode radio modem in accordance with at least one embodiment of the present invention.

FIG. 3A discloses an example communication configuration in accordance with at least one embodiment of the present invention. Again, in this example the three peripheral apparatuses (300, 302 and 304) are attempting concurrent communication with WCD 100 through dual-mode radio modem 306. Radio modem 306 may include local control resources for managing both "radios" (e.g., Bluetooth™ and ULP-BT software based radio control stacks) attempting to use PHY layer resources of dual-mode radio modem 306. In this example, radio modem 306 may include at least two radio stacks or radio protocols (labeled "Bluetooth" and "ULP-BT") that may share PHY layer resources (e.g., hardware resources, antenna, etc.) of radio modem 306. The local control resources may include an admission controller ("Adm Ctrl") and a dual-mode controller ("DuMo Manager"). These local control resources may be embodied as a software program and/or in hardware form (e.g., logic apparatus, gate array, MCM, ASIC, etc.) in a dual-mode radio modem interface, and the radio modem interface may be coupled to, or alternatively, embedded in dual-mode radio modem 306. The interaction of these control resources with the protocols utilizing dual-mode radio modem 306 is explained below.

Figure 3B:
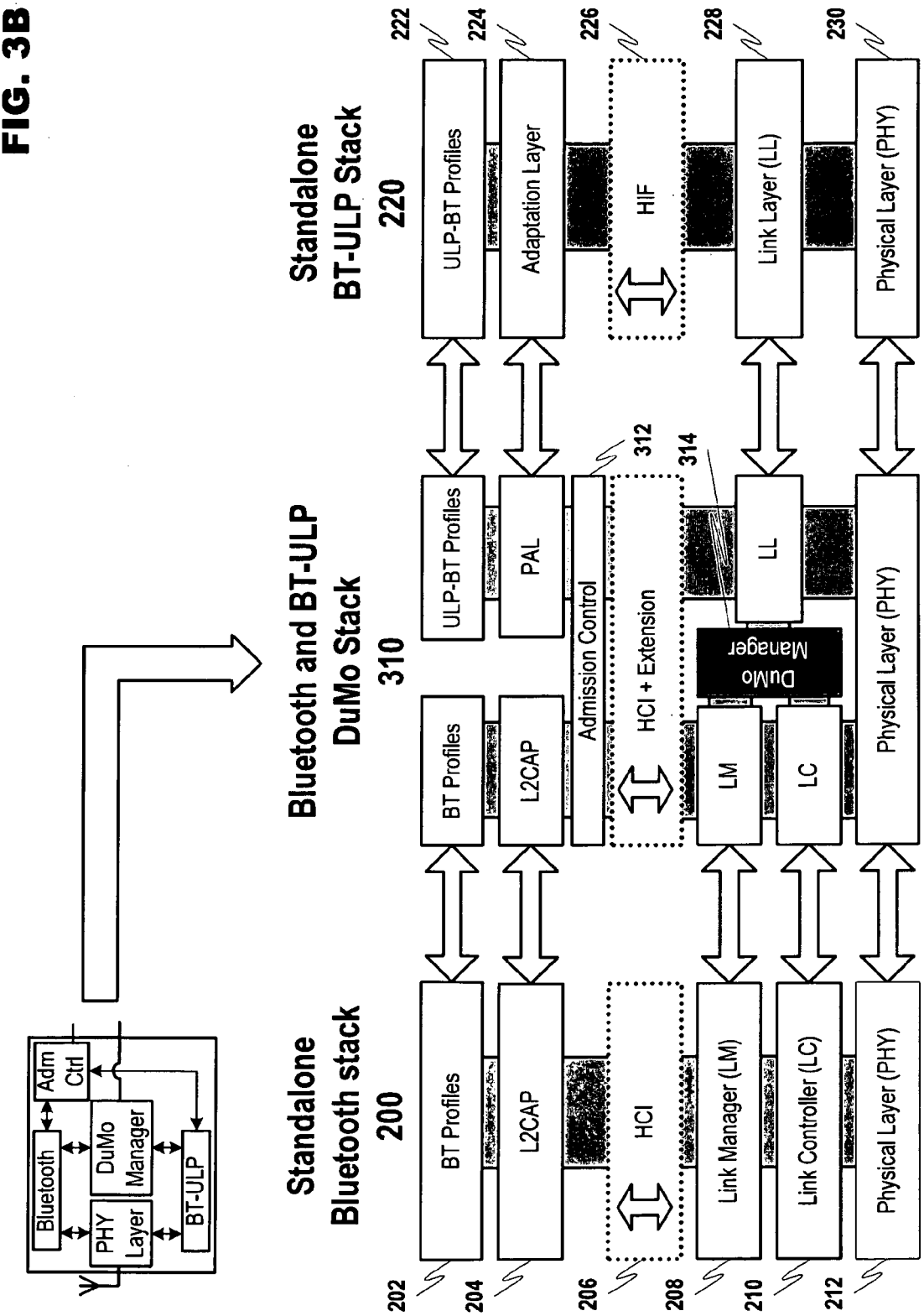
FIG. 3B discloses further detail pertaining to the example of FIG. 3A regarding operational enhancements for managing the operation of a dual-mode modem in accordance with at least one embodiment of the present invention.

In FIG. 3B, an example combination of the two individual radio protocol stacks discussed in FIG. 2 into a single dual-mode communication entity is now disclosed. Local control may be implemented by at least an admission control 312 and a DuMo manager 314. The two previously described standalone protocol stacks are shown to establish the individual elements that may be incorporated into integrated dual-mode entity 310. For a more specific discussion of the functioning of admission control 312 and a DuMo manager 314 in terms of managing the operations of dual-mode modem 306, please refer to application Ser. No. 11/538,310, filed Oct. 3, 2006, which is hereby incorporated by reference. Briefly, Admission control 312 may operate as a gateway for dual-mode radio modem 306 by filtering out Bluetooth™ and ULP-BT communication requests from other entities in WCD 100 that may result in conflicts. Scheduling information may also be provided by Multiradio controller (MRC) 170, wherein certain periods of operation are allocated to dual-mode radio modem 306 in view of the other active radio modems operating in WCD 100. This scheduling information may be passed down to both the HCI+Extension level of the dual-mode stack and also to DuMo manager 314 for further processing. However, if scheduling information from MRC 170 is critical (e.g., delay-sensitive), it may be sent through MCS 190 via a direct connection to DuMo Manager 314. The information received by DuMo manager 314 may be used to create a schedule for dual-mode radio modem 300 allowing both Bluetooth™ and ULP-BT to operate substantially concurrently.

IV. Protocol Stacks and Message Routing

Figure 4:
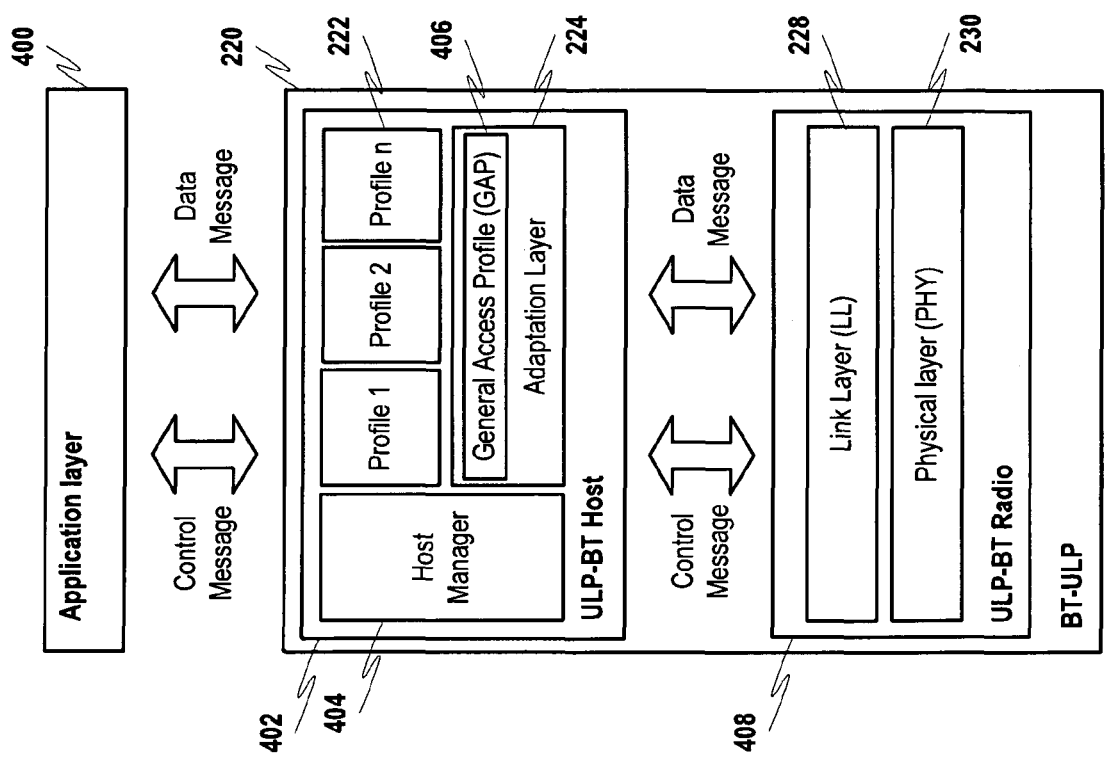
FIG. 4 discloses a more detailed example of an Ultra Low Power Bluetooth™ protocol stack in accordance with at least one embodiment of the present invention.

FIG. 4 discloses a more detailed example of the upper layers of the ULP-BT communication protocol. The ULP-BT system may include two parts: ULP-BT Radio 408 and ULP-BT Host 402. Connection between radio 408 and host 402 may pass through the HIF (Host Interface). Further, adaptation layer 224 may include at least General Access Profile (GAP) 406.

Application layer 400 may include, for example, various programs executable by a computing apparatus. Example applications may include communication, entertainment or productivity programs running on WCD 100. An application may use ULP-BT Profiles 222 in ULP-BT (e.g. Profile 1, Profile 2, etc.) in order to send information into the ULP-BT protocol stack 220 in a transaction supervised by Host Manager 404. The information may then be prepared by adaptation layer 224 and GAP 406 for routing to ULP-BT radio 408, wherein LL 228 may both establish new wireless connections and manage existing connections with peripheral apparatuses through the resources (modem, antenna, etc.) included in PHY layer 230.

V. Communication Between an Advertiser and at Least One Receiving Apparatus with Connection.

Figure 5:
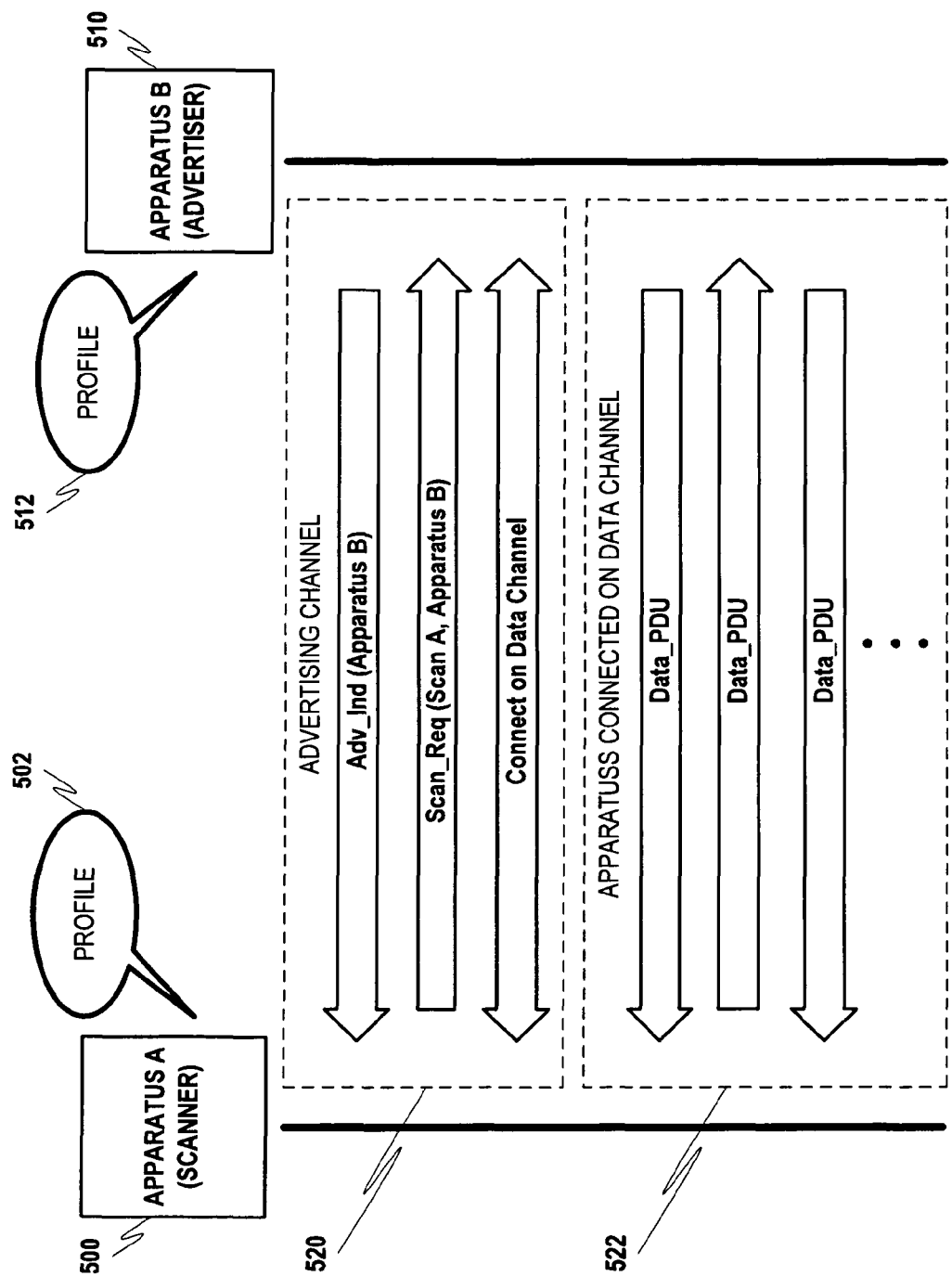
FIG. 5A discloses an example of communications between an advertiser and a receiving apparatus in accordance with at least one embodiment of the present invention.
FIG. 5B discloses example Ultra Low Power Bluetooth™ message structures usable in accordance with at least one embodiment of the present invention.

Referring now to FIG. 5A, an example communication between apparatuses, including the establishment of a formal network connection, is disclosed. Apparatus A 500 (hereafter referred to as scanner 500) may initiate wireless communication with Apparatus B (hereafter referred to as advertiser 510) after receiving a broadcast signal from advertiser 510. The initiation of wireless communication by scanner 500 and subsequent interaction between these apparatuses may be automatic or manual (e.g., including at least some intervention from user). Apparatuses 500 and 510 may also include communication profiles 502 and 512, respectively. Further, these apparatuses may be known to each other before the interaction shown in FIG. 5A (e.g., they may be two apparatuses owned by the same user), or alternatively, they may have previously been unknown to each other, such as in a example scenario where a user in possession of WCD 100 moves into transmission range of advertiser 510 at a public location, such as a shopping mall.

As set forth above, advertiser 510 may broadcast a signal to all apparatuses within transmission range. The advertising signal may be repeated periodically, may be triggered by another apparatus (e.g., a motion sensor) alerting advertiser 510 to the presence of a potential scanning apparatus 500, etc. Information included in the broadcast signal, ADV_IND, may include introductory information at least identifying advertiser 510, for example in the form of a dedicated apparatus name, and possibly also including profile information. This identification may be public (e.g., the actual fixed apparatus address) or may be private (e.g., a dynamically generated pseudonym that receiving apparatuses can decode, using an algorithm, and compare to stored information to determine whether advertiser 510 is the same device as previously encountered without disclosing the public address of the advertiser). For security reasons, there are few scenarios where an apparatus would actually need to disclose its public address. The ADV_IND message may be broadcast, according to at least one embodiment of the present invention, on an advertising channel. All potential scanners 500 may be aware that any broadcast messages should be expected on the designated advertising channel (also, in some instance, called the initialization channel). In a more specific scenario, ULP-BT may include three predetermined advertising channels. Therefore, scanner 500 and advertiser 510, when using ULP-BT, may be able to utilize one or more of the three advertising channels in a strategy to enhance broadcast coverage in view of advertising channel availability.

Scanner 500, upon receiving the ADV_IND message from advertiser 510, may either ignore the message and continue listening for another ADV_IND message with different content, or initiate communications with advertiser 510. At least one scenario where scanner 500 may continue to listen to the advertising signal may be in order to collect all available introductory information from advertiser 510 (e.g., advertiser identification and available profile information). Scanner 500 may respond, for example, if advertiser 510 is identified and/or recognized as having information of interest to an apparatus user. This recognition may occur automatically, or alternatively, the user may be alerted to the presence of advertiser 510, whereby the user may act manually by prompting scanner 500 (e.g., WCD 100) to respond to the advertising message. Alternatively, scanner 500 may respond simply by acknowledging the reception of information from advertiser 510. Scanner 500 may then transmit a message requesting a formal network connection with advertiser 510. If advertiser 510 is in a condition to honor the request (e.g., advertiser 510 is, for example, not already connected to another apparatus/exceeded maximum connections, has adequate power, etc.) a formal network connection may be established between the two apparatuses 500 and 510.

A formal network connection, such as shown in FIG. 5A ("APPARATUSES CONNECTED ON DATA CHANNEL"), will not be established on the advertising channel. Instead, a different channel specifically for the subsequent exchange of data may be selected by one or both of the apparatuses. This new connection will allow the apparatuses to exchange information without occupying the advertising channel. The exchange of data (e.g., Data_PDU) may continue until scanner 500 receives all data requested from advertiser 510, or alternatively, until either apparatus breaks the link (e.g., out of range, power limitation, interference, etc.)

VI. Example ULP-BT Messaging.

FIG. 5B discloses five examples of ULP message structures (e.g., that may be used, for example, as introduction messages) that may be usable with various embodiments of the present invention. For example, connectable advertising events in BT-ULP may contain ADV_IND message transmissions (e.g., 550) from advertiser 510. These messages may include a header section to identify and direct the message, and a payload section including message data. As shown in FIG. 5B, the header may include identification information for ADV_IND message 550, including Type, AAdd and RFU. The least significant bit (LSB) and most significant bit (MSB) are also indicated in example ADV_IN message 550. AAdd in the header of ADV_IND may indicate whether the advertiser's address in the AdvA field is public (AAdd=0) or private (AAdd=1). Len may indicate the size of the payload (e.g., AdvA and Data) in octets. The two MSB of the Length field are reserved bits and may be set to zero and ignored upon receipt. The payload field shall comprise of AdvA and Data fields. The AdvA field shall contain the advertiser's apparatus address. The data field may contain any data.

Scanner 500 may respond to ADV_IND message 550 and may request further information about advertiser 510 with a SCAN_REQ message 552. Scanner 500 may request a LL 228 connection to advertiser 510 using a CONNECT_REQ message. Scanner 500 is allowed to transmit their own request messages only after successfully received ADV_IND messages.

After every ADV_IND message transmission, advertiser 510 shall listen for a SCAN_REQ and CONNECT_REQ message on the same channel. If no message is received on the advertising channel, Advertiser 510 may move to the next predetermined advertising channel to transmit another ADV_IND message, or to close the event. The time between the beginning of two consecutive ADV_IND messages within an event shall be less than or equal to 1.5 ms. However, if advertiser 510 receives a correct SCAN_REQ message 552 from an approved or recognized apparatus (e.g., scanner 500), it may reply with SCAN_RSP message 554 after the end of the SCAN_REQ message. Otherwise, the message may be ignored if the apparatus is not approved. After SCAN_RSP 554 transmission, advertiser 510 may either move to the next used advertising channel to transmit another ADV_IND message, or to close the event.

An example payload for SCAN_RSP 554 is shown in FIG. 5B at 556. The AdvA field may contain the apparatus address of advertiser 510 (the apparatus from which the message was transmitted). The ProfileID may be used to indicate one profile supported by advertiser 510. MoreProf may be used to indicate whether advertiser 510 also supports other profiles in addition to the one indicated by the ProfileID. If MoreProf is set to zero, this may indicate that no other profiles are supported. If it is set to one, this may indicate that advertiser 510 also supports other profiles. EncReq may be set to indicate whether advertiser 510 requests possible LL 228 connections to be created in an open or encrypted mode. For example, EncReq may be set to zero to indicate open (unencrypted) connections and may be set to one to indicate that the connections should be in encrypted mode. The RFU bits may be set to zero and ignored upon receipt. AdvName may contain a user or application-given advertiser name (e.g., a name string from left to right coded in UTF-8 format). It is important to note that the LL of scanner 500 is not being requested to react to any of the values in the payload field (e.g., EncReq) but instead, all values are intended for use by advertiser 510.

A connectionless advertising event may contain information only from advertiser 510. This message may be used, for example, to broadcast information from advertiser 510 without the need of establishing a formal connection to another apparatus (e.g., scanner 500). Advertiser 510 may transmit only ADV_NONCONN_IND messages 558, and may ignore any request for further information about advertiser 510 or for a LL connection from other apparatuses. Scanner 500 may not actively participate in this transaction (e.g., send messages). Each event shall contain one ADV_NONCONN_IND message 558 on every used advertising channel. Advertising channel usage may be determined by advertiser 510. After every ADV_NONCONN_IND message 558 transmission, advertiser 510 may either move to the next used advertising channel to transmit another ADV_NONCONN_IND message 558, or to close the event. An event may also be closed, for example, after completion of advertising message transmission in every used advertising channel.

ADV_NONCONN_IND message 558 may have a structure and content as shown in FIG. 5B. Type may be set to 0x1. AAdd in the header may indicate whether the address of Advertiser 510 in the AdvA field is public (e.g., AAdd=0) or private (e.g., AAdd=1). Len may indicate the size of the payload (AdvA and Data) in octets. The two MSB of the Length field may be reserved bits, and may further be set to zero and ignored upon receipt. The payload may include a 48-bit AdvA field and up to 31 octets of data. The AdvA field may contain the address of advertiser 510. The data field can contain any data from the host of advertiser 510.

VII. Example Device Interaction.

Figure 6:
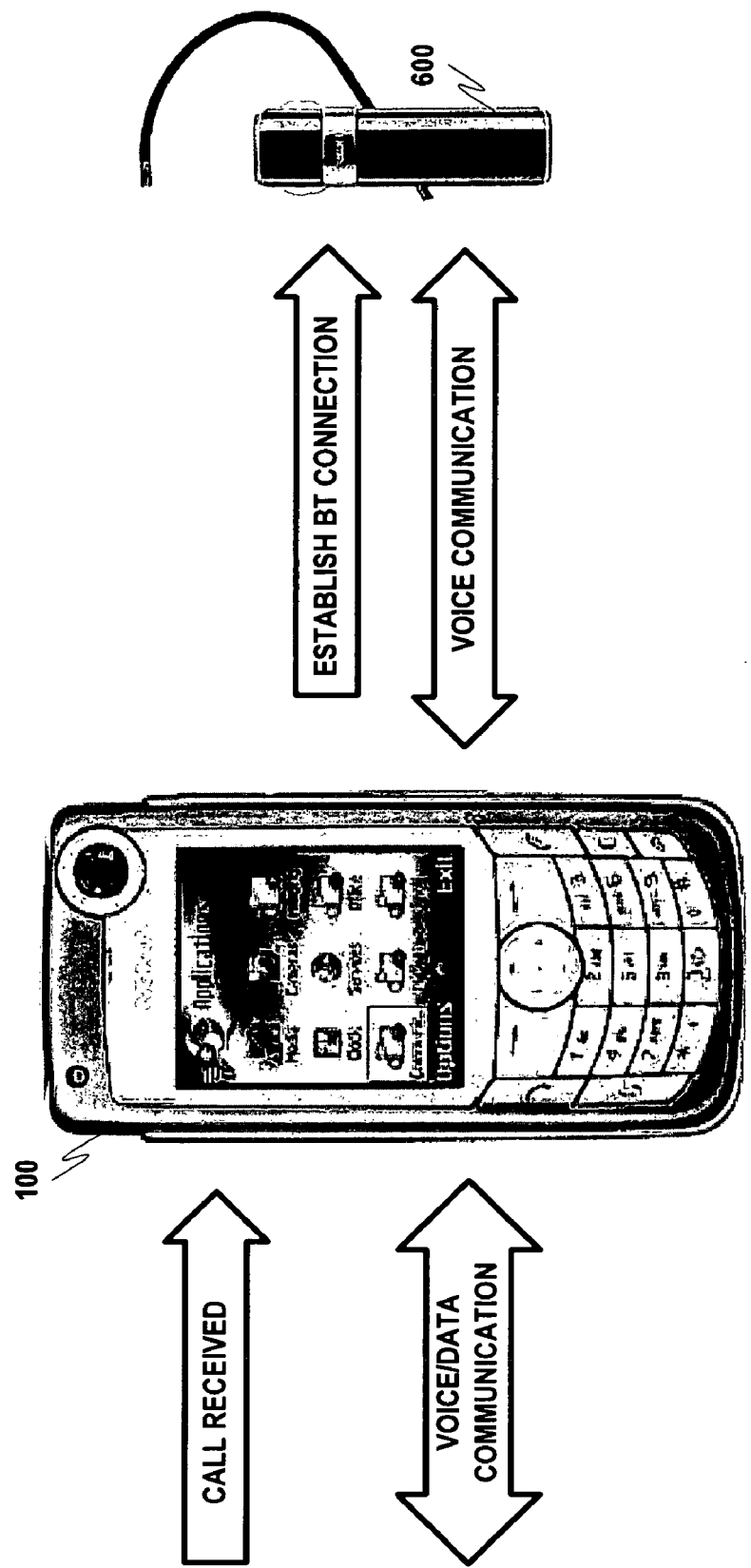
FIG. 6 discloses an example scenario wherein an apparatus may communicate with a peripheral apparatus in accordance with at least one embodiment of the present invention.

FIG. 6 discloses an example scenario wherein apparatuses may communicate via a wireless communication medium. WCD 100 may receive wireless communication such as, for example, a telephone call (e.g., voice communication), data from an access point, etc. In the example of a cellular telephone call, a user may desire to conduct the conversation in a hands-free manner, using the example headset 600 also shown in FIG. 6. A connection between WCD 100 and headset 600 may be established via a short-range wireless medium, like Bluetooth™ (BT) as disclosed in FIG. 6. After the BT link is established, voice information may be exchanged between the apparatuses via the BT link. While established a connection between WCD 100 and headset 600 in order to conduct a telephone conversation has been used for the sake of example, the various example embodiments of the present invention are not limited to this example interaction. On the contrary, the present invention may be implemented with a variety of wireless-enabled apparatuses combined in order to facilitate a particular application.

VIII. A Further Example of Device Interaction.

While the example scenario described in FIG. 6 may facilitate "hands-free" operation with respect to a telephone conversation, this rudimentary interaction is somewhat limited. In terms of this example, there is no way to determine who is calling into WCD 100 in a situation where WCD 100 resides, for example, in a pocket of the user of the apparatus, and the only operations that may be implemented from headset 600 deal specifically with the functionality provided by the peripheral apparatus. The functionality that may be implemented in such an interaction may be enhanced in accordance with various example embodiments of the present invention. FIG. 7 discloses an example configuration utilizing three apparatuses.

WCD 100 and headset 600 are similarly disclosed in FIG. 7. Again, these apparatuses may be coupled via a short-range wireless communication medium like Bluetooth™ BT. In addition to the aforementioned devices, a wristwatch-type apparatus 700 (hereafter, "wristwatch" for explanation herein) is now introduced. Wristwatch 700 may be, for example, a digital device configured to communicate via at least one wireless communication medium. However, due to size and power limitations, the resources in wristwatch 700 may be somewhat limited. In at least one embodiment of the present invention, wristwatch 700 may include functionality commonly associated with typical digital wristwatch devices, and may also include some basic operating system software allowing for the display and mapping of information received via the wireless communication medium. Basic wireless transmission/reception resources may also be included.

In the example depicted in FIG. 7, WCD 100 may transmit information to wristwatch 700 via ULP-BT. This particular medium has been utilized for explanation in this example because it is especially suited for resource-limited apparatuses. However, the various embodiments of the present invention are not limited to the use of this particular wireless communication medium, and may in turn utilize other wireless transports. Also in this example, wristwatch 700 may be further configured to transmit information via ULP-BT to WCD 100.

The example communications in FIG. 7 have been further labeled with the type of information that may be transferred in accordance with the example. As previously described, the interaction between WCD 100 and headset 600 may exchange voice data over BT. Caller information data may be transmitted to wristwatch 700 from WCD 100. This information may include, for example, image data, text data and/or instruction information. The image data may be sent in a rudimentary form (e.g., pixel data) so that it does not require substantial processing before displaying. Moreover, in accordance with at least one embodiment of the present invention, all information that is transmitted to wristwatch 700 may be utilized in real time and then be discarded after use. This may allow a simpler device to avoid expending resources in storing the information in a static memory before and/or after use. Instead, information may be stored in temporary memory, such as RAM memory, for processing and then erased after use. As part of the utilization of the information provided by WCD 100, image, text and/or instruction data may be sent to wristwatch 700 to create a rudimentary user interface. A person may use the user interface in order to select a desired activity, which may trigger a control response message that may be sent to WCD 100. In FIG. 7, control response messages are also sent via ULP-BT.

Now referring to FIG. 8, an example communication progression in accordance with at least one embodiment of the present invention is now disclosed. Timelines 800 depict the progression of time moving from the top of the figure to the bottom. Initially, WCD 100 may request information from wristwatch 700 and headset 600, such as shown at 802, in order to establish communication links with these apparatuses. Configuration information provided as part of the example communication of 802 may be received in response to the aforementioned configuration information requests, and may dictate how WCD 100 will interact with the devices providing such information. In at least one example scenario, WCD 100 may store apparatus characteristic information received via wireless communication. For instance, the apparatus corresponding to the characteristic information may provide the information via a previously configured secure wireless link (e.g., configured via a "pairing" operation). This information may detail communication parameters and/or requirements usable when interacting with these apparatuses. Apparatus characteristic information may include, for example, parameters and/or characteristics corresponding to the user interface of an apparatus (e.g., size, format, color support, resolution, etc). In the example of wristwatch 700, WCD 100 may learn the operational limitations for the somewhat resource-limited apparatus, and as a result, may customize the information sent to this device so that it may function successfully within its limited capacity.

After the initial configuration is complete, the system may wait for a subsequent event to trigger interaction. For example, data received by WCD 100, may trigger an incoming data announcement to be transmitted to wristwatch 600 and/or headset 600 as shown at 804. The determination regarding whether to send incoming data announcements one or both peripheral devices may depend, for example, upon the interface abilities of the particular apparatus, which may be established in WCD 100 as a part of the configuration established at 802. The incoming data announcement may result in, for example, an alert and/or user interface created in response to the communication received in WCD 100. Combined text, image and/or instruction data may create a user interface that may give users options as to how to proceed with respect to the event.

806 in FIG. 8 represents two possible responses to the event. For instance, actuation of an interface option in the user interface of wristwatch 700 may result in a control response message being sent back to WCD 100. Alternatively, actuation of an interface option on headset 600 (e.g., a connect button) may convey a control response back to the primary apparatus (e.g., WCD 100). For example, on occurrence of a message being sent from headset 600 to WCD 100, wristwatch 700 may either clear itself in view of a predetermined timeout without user interaction, or alternatively, WCD 100 may send another message to wristwatch 600 causing it to discard the user interface data. Either control response message may result in triggering an activity that may be implemented by WCD 100. For example, the BT link between WCD 100 and headset 600 may become active as shown at 808, followed by answering the incoming telephone call and the conveying of voice information between the two apparatuses.

FIG. 9 discloses example images that may be created on wristwatch 700 in accordance with various example embodiments of the present invention. These images may be stored in a database residing, for example, on WCD 100. When an incoming communication is received on WCD 100, information in the communication may identify the source. The images in the database may be stored by source, and may be access the particular image corresponding to the source of the current message. Further, the database may also contain other information, such as contact information for each source. Continuing with the previous example, WCD 100 may receive a telephone call. Information already saved in WCD 100 and/or received as part of the message may be displayed on WCD 100. This information may include identification information for the source of the communication, an image associated with the incoming information, etc. All or part of this information may be utilized to formulate an image for announcing the incoming communication. It is important to note that, in accordance with at least one embodiment of the present invention, most of the information processing and/or image formulation may be completed on WCD 100 prior to sending any messages to other apparatuses so as to lessen the processing burden on apparatuses like wristwatch 700. In this way, image information formulated in the main apparatus (e.g., WCD 100) may be provided for display on other apparatuses without occupying the limited resources available in the receiving apparatus.

Two examples of incoming data announcement images are disclosed in FIG. 9. A first example user interface 900 for wristwatch 700 may include text, pixel and or instruction data. In various embodiments of the present invention, the text and image information may be combined in a simple pixel format that may be displayed with little processing required on the part of the receiving apparatus. Further, instruction information contained in the incoming data announcement may tie user interface elements, like example buttons 902 and 904, to possible activities that may be triggered by a user. In accordance with the example scenario, button 902 may trigger the sending of a control message to WCD 100 that would answer the incoming call and activate headset 600. Button 904 may trigger a control message that prompts WCD 100 to send the call directly to voicemail, for example, without waiting the number of requisite rings.

The control response messages sent by wristwatch 700 may, in accordance with at least one embodiment of the present invention, be as simple as message packets with certain bits being set depending on the way the user interface has been actuated. Activity in WCD 100 may be triggered based on the interpreted bit conditions in these message packets. In an alternate example of a user interface, the incoming data announcement message may trigger the creation of interface 910 which again include text, image and instruction information to configure buttons 912 and 914, which may be actuated in order to trigger activity in WCD 100. However, user interface image 910, displayed from image information in a received message (e.g., an incoming data announcement), may be repeatedly cycled with blank screen 920, also sent by WCD 100, to create a "flashing" effect in wristwatch 700.

More specifically, protocols may be utilized to negotiate a type of display image (size, pixel format) in an interface apparatus (e.g., wristwatch 700) and whether this apparatus includes buttons around the edges of the display (or any other type of user input). The source apparatus (e.g., WCD 100) may then send an image (in pixels) and if any button is pressed, the interface apparatus may inform the source apparatus (e.g., in the form of a control response message). Thus, the source apparatus may send whatever pictures that may be associated with the desired functionality, and the interface device doesn't have to understand any more than just showing the pixels and sending messages in response to interface actuation (e.g., button presses). An example application for such protocol is a call control from the user interface of wristwatch 700. For example, WCD 100 may send a picture saying that an incoming call has been received with a related caller name or number. A user may reject, accept or whatever options may provided as part of the user interface on wristwatch 700. For instance, touching a soft key in a touch screen, pressing a hard button, etc. on wristwatch 700 may result in one or more control responses being sent to WCD 100. Control responses may contain, for example, simple indication information identifying the control interface that was actuated on the peripheral device (e.g., button #1, key #2, etc.). WCD 100 may interpret the received actuated control identifications as corresponding to control commands. For example, the receipt of a control response identifying "button #1" may correspond to commands such as accept call, reject call, mute, speaker phone, etc.

The incoming data announcement may include, for example, an image of a calling party (facilitated by this example remote display pixel concept, where on the same image, the action buttons and maybe also caller name/number may be included. The image may be, in accordance with an example embodiment of the present invention, a photo of the calling party taken with a camera embedded in WCD 100 (if so equipped) and may also be displayed on WCD 100 (possibly in a reduced size due to the difference in display characteristics between WCD 100 and wristwatch 700). Further, in the event of incoming call, another signal (in addition to pixel information utilized, for example, to establish an image) may be sent to the display of wristwatch 700 in a sequential manner to create blinking (e.g. alternating pixel info and a blank screen).

As an alternative to the above configuration, in at least one embodiment of the present invention the blinking effect may be provided by transmitting image (e.g., photo) and control information to a peripheral device (e.g., wristwatch 700) instead of repeatedly alternating between transmitting image information and blank screens to the peripheral device. The control information may comprise, for example, certain bits configured to inform wristwatch 700 that the image information should be displayed in a blinking mode by switching between displaying the previously received image information and a blank screen. Having the peripheral device perform the blinking behavior internally may help to ensure that resources are not unnecessarily spent on repeatedly transmitting and receiving image and blank screen information in sequence during an event (e.g., a phone call). Further, links between image information and particular events (e.g., certain callers) may be stored in memory 152 (such as in a phonebook database) of WCD 100. Some or all of this information may be used for determining data (e.g., images) that should be included in incoming data announcements to peripheral devices. In a scenario where no image information associated with an event, "default" or generalized image data may be sent.

Figure 10A:
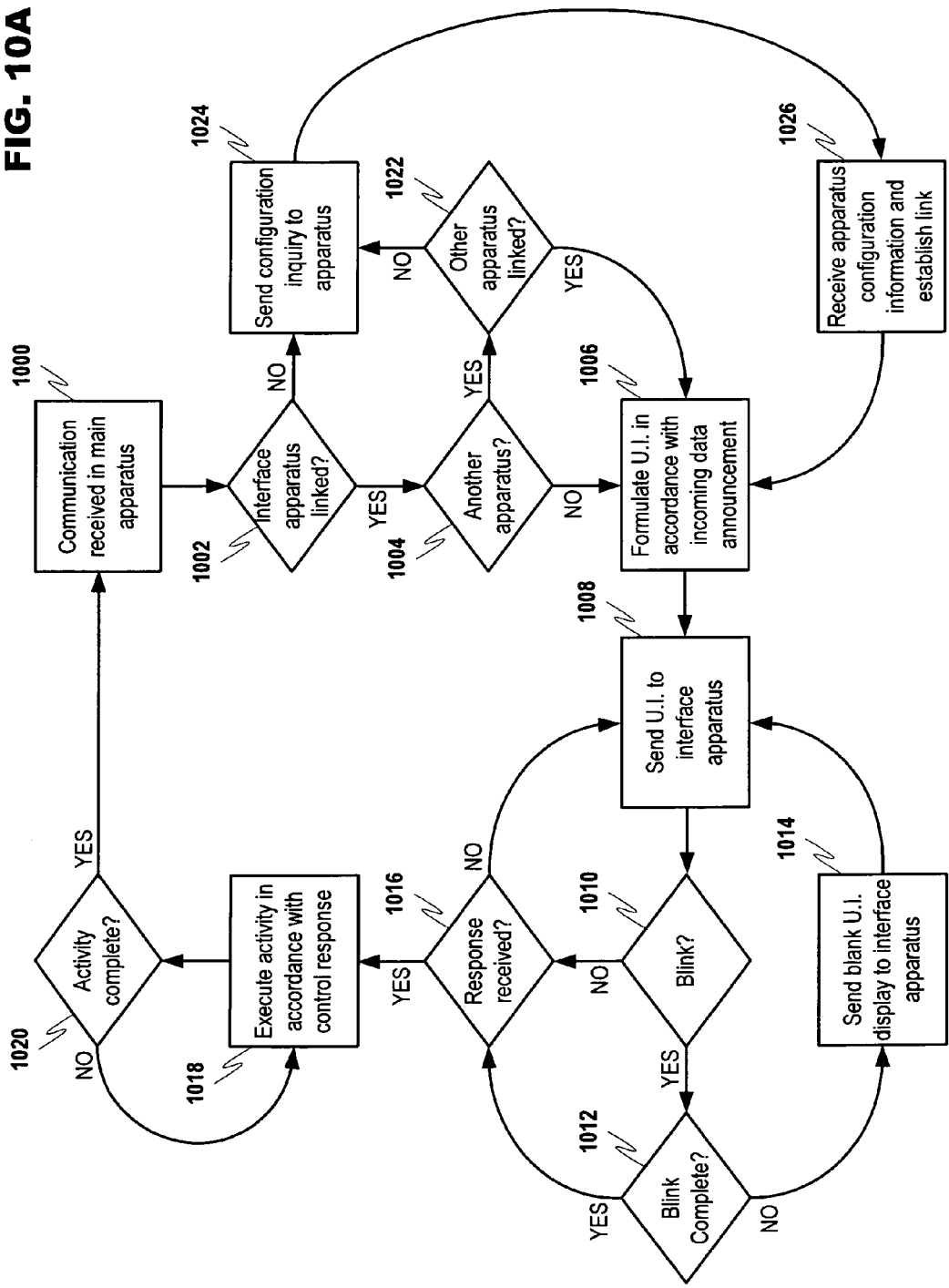
FIG. 10A discloses a flowchart of an example process for apparatus operation in accordance with at least one embodiment of the present invention.

A flowchart of an example apparatus communication process in accordance with at least one embodiment of the present invention is now disclosed with respect to FIG. 10A. In step 1000, communication may be received in a main apparatus that may be, for example, a communication apparatus like WCD 100. A determination may then be made in step 1002 as to whether a wireless link already exists between the main apparatus and an interface apparatus (e.g., wristwatch 700). If this link already exists, then a further determination may be made in step 1004 as to whether another apparatus (e.g., headset 600) should also be linked to the main apparatus. If no other apparatuses require link establishment, then in step 1006 a user interface (U.I.) image may be formulated in accordance with the communication that was received in step 1000. This image information may include an image corresponding to the source of the communication received in the main device, the image being selected from, for example, a database residing on the main apparatus. Moreover, the U.I. information may further be configured or tailored for display on the interface apparatus, the configuration being based upon characteristics of, and/or parameters corresponding to, the interface apparatus. The resulting message, including at least the U.I. information and possibly information corresponding to the communication received in the main apparatus, may then be forwarded to the interface apparatus in step 1008. So, in accordance with at least the example embodiment of the present invention as disclosed FIG. 10A, all of the U.I. information may fully processed in the main apparatus (e.g., WCD 100) based at least in part upon the characteristics of the interface apparatus (e.g., wristwatch 700) so that a U.I. can be displayed on the interface apparatus without any further processing of the forwarded message.

A determination may then be made in step 1010 as to whether blinking has been configured for the U.I. being displayed in the interface apparatus. If blinking has been configured, then in steps 1008, 1010, 1012 and 1014 a series of wireless messages including alternating U.I. information based at least in part upon the communication received in the main apparatus and blank U.I. information may be sent to the interface apparatus in order to create a blinking effect in the U.I. It is important to note that the example blinking process generated by messages sent from the main apparatus to the interface apparatus steps 1008-1014 of FIG. 10A is but one example of a process that may be used to create a blinking effect in accordance with various embodiments of the present invention. The various embodiments of the present invention are not specifically limited to the disclosed process, and as a result, other processes may be used to create a blinking effect, such as the process described with respect to FIG. 10B.

If the blink cycle is determined to be complete in step 1012, or if blinking was not initially configured in step 1010, the process may move to step 1016 wherein a determination is made regarding the receipt of a control response. In particular, the main apparatus may check to see if a control response message (triggered, for example, in response to user actuation of buttons on the interface apparatus) has been received. Upon receipt of a control response message, the main device (e.g., WCD 100) may execute one or more activities in accordance with information received in the control response message (step 1018). These activities may continue to execute until determined to be complete in step 1020, wherein the process may restart again at step 1000.

However, if in step 1002 it is determined that no interface apparatus is currently linked, then in step 1024 an inquiry may be sent to one or more potential interface apparatuses in order to obtain configuration information. This configuration information may be used in step 1026 to configure the main apparatus for appropriate communication (e.g., in view of the available resources in the selected interface apparatus) and to establish a wireless link. The process may then proceed to step 1006, wherein U.I. information may be formulated in view of information related to the communication received in the main apparatus and characteristics of the newly linked interface apparatus. Likewise, if another apparatus is determined to exist in step 1004 (e.g., headset 600), then in step 1022 a determination may be made as to whether a link needs to be established between apparatuses. If a link is not already established, then the process may return to step 1024 in order to receive configuration data and establish a link with the other apparatus. If a link exists, then the process may proceed to step 1006 to display the interface.

Figure 10B:
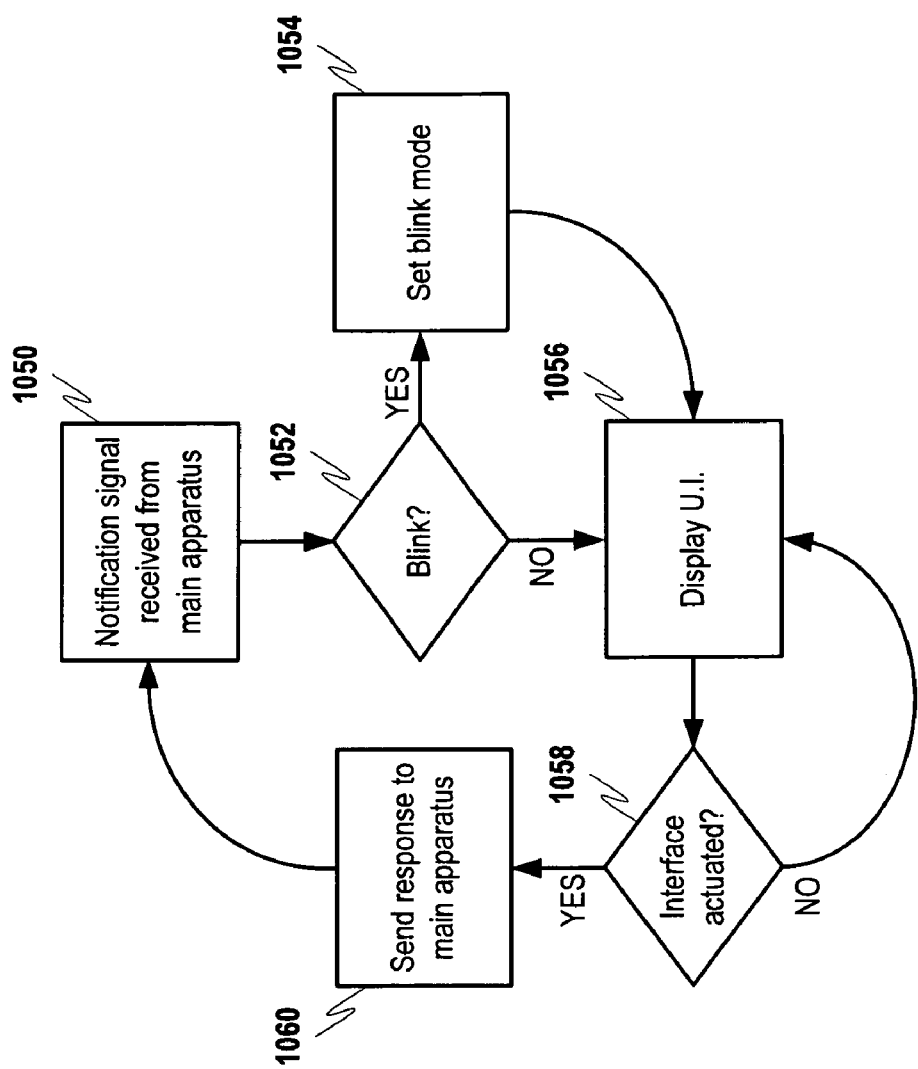
FIG. 10B discloses a flowchart of an example process for peripheral apparatus operation in accordance with at least one embodiment of the present invention.

A flowchart corresponding to another example process is disclosed in FIG. 10B. This process reflects the activities that may occur on a receiving apparatus, such as an interface apparatus, in accordance with at least one embodiment of the present invention. In step 1050 a notification signal from the main device may be received in an interface device. The notification signal may include information indicating whether the U.I. created in the interface apparatus should blink, or alternatively, configurations in the interface apparatus may determine if the U.I. will blink. Regardless, if a determination is made in step 1052 that a blink mode has been set, then in step 1054 a blink mode may be set in the interface apparatus. The blink mode disclosed in FIG. 10B may, in accordance with at least one embodiment of the present invention, be implemented by software and/or hardware residing in the interface apparatus in order to achieve an effect similar to that previously described with respect to steps 1008-1014 in FIG. 10A.

Regardless of whether it is determined that a blink mode has not been configured in step 1052, or if a blink mode been configured in step 1054, the process may proceed to step 1056 wherein a U.I. may be displayed on the interface apparatus. The displayed U.I. may, in accordance with at least one embodiment of the present invention, include real or soft-coded interface components (e.g., buttons) that a user may actuate in order to trigger activities that may be desired pertaining the communication originally received in the main apparatus (e.g., WCD 100). The process may continually check for the actuation any U.I. components in step 1058. If a U.I. component is actuated, the interface apparatus may send a response message to the main apparatus in step 1060. The response message may contain, for example, information usable by resources in the main apparatus for determining one or more activities to execute. The process may then return to step 1050 to await another notification signal from the main apparatus.

Accordingly, it will be apparent to persons skilled in the relevant art that various changes in forma and detail can be made therein without departing from the spirit and scope of the invention. The breadth and scope of the present invention should not be limited by any of the above-described example embodiments, but should be defined only in accordance with the following claims and their equivalents.

What is claimed:

1. A method, comprising:
receiving communication at a first apparatus, the communication being directed to a user of the first apparatus;
maintaining characteristic information in the first apparatus regarding a user interface in a second apparatus;
creating an image in the first apparatus based on at least the communication and the characteristic information regarding the user interface in the second apparatus;
creating a message in the first apparatus comprising at least the image; and
sending the message from the first apparatus to the second apparatus via a wireless link for displaying the image on the user interface of the second apparatus.

2. The method of claim 1, wherein the first apparatus receives at least part of the characteristic information from the second apparatus via the wireless link.

3. The method of claim 1, wherein the message further comprises instruction information configured to cause the image to be displayed on the user interface of the second apparatus, the image comprising indicia corresponding to one or more real or soft-coded buttons.

4. The method of claim 3, wherein the instruction information further causes the displayed user interface to blink.

5. The method of claim 1, further comprising receiving a response message from the second apparatus, wherein the response message is sent from the second apparatus in response to user actuation of one or more real or soft-coded buttons.

6. The method of claim 5, wherein the response message causes the first apparatus to establish communication with another apparatus different from the second apparatus.

7. The method of claim 1, wherein the image comprises pixel information, the pixel information identifying the source of the communication.

8. The method of claim 7, wherein the image comprises pixel information, the pixel information identifying functionality corresponding to one or more real or soft-coded buttons in the second apparatus.

9. The method of claim 7, wherein the first apparatus comprises one or more images each corresponding to different possible sources of the communication, the one or more images being stored in a database along with corresponding source contact information.

10. A computer program product comprising computer executable program code recorded on a non-transient computer readable storage medium, the computer executable program code comprising:
code configured to receive communication at a first apparatus, the communication being directed to a user of the first apparatus;
code configured to maintain characteristic information in the first apparatus regarding a user interface in a second apparatus;
code configured to create an image in the first apparatus based on at least the communication and the characteristic information regarding the user interface in the second apparatus;
code configured to create a message in the first apparatus comprising at least the image; and
code configured to send the message from the first apparatus to the second apparatus via a wireless link for displaying the image on the user interface of the second apparatus.

11. The computer program product of claim 10, wherein the first apparatus receives at least part of the characteristic information from the second apparatus via the wireless link.

12. The computer program product of claim 10, wherein the message further comprises instruction information configured to cause the image to be displayed on the user interface of the second apparatus, the image comprising indicia corresponding to one or more real or soft-coded buttons.

13. The computer program product of claim 12, wherein the instruction information further causes the displayed user interface to blink.

14. The computer program product of claim 10, further comprising receiving a response message from the second apparatus, wherein the response message is sent from the second apparatus in response to user actuation of one or more real or soft-coded buttons.

15. The computer program product of claim 14, wherein the response message causes the first apparatus to establish communication with another apparatus different from the second apparatus.

16. The computer program product of claim 10, wherein the image comprises pixel information, the pixel information identifying the source of the communication.

17. The computer program product of claim 16, wherein the image comprises pixel information, the pixel information identifying functionality corresponding to one or more real or soft-coded buttons in the second apparatus.

18. The computer program product of claim 16, wherein the first apparatus comprises one or more images each corresponding to different possible sources of the communication, the one or more images being stored in a database along with corresponding source contact information.

19. A first apparatus comprising:
   at least one communication module; and
   a processor, the processor being configured to:
      receive communication, the communication being directed to a user of the first apparatus;
      maintain characteristic information in the first apparatus regarding a user interface in a second apparatus;
      create an image in the first apparatus based on at least the communication and the characteristic information regarding the user interface in the second apparatus;
      create a message in the first apparatus comprising at least the image; and
      send the message from the first apparatus to the second apparatus via a wireless link for displaying the image on the user interface of the second apparatus.

20. The apparatus of claim 19, wherein the first apparatus receives at least part of the characteristic information from the second apparatus via the wireless link.

21. The apparatus of claim 19, wherein the message further comprises instruction information configured to cause the image to be displayed on the user interface of the second apparatus, the image comprising indicia corresponding to one or more real or soft-coded buttons.

22. The apparatus of claim 21, wherein the instruction information further causes the displayed user interface to blink.

23. The apparatus of claim 19, further comprising receiving a response message from the second apparatus, wherein the response message is sent from the second apparatus in response to user actuation of one or more real or soft-coded buttons.

24. The apparatus of claim 23, wherein the response message causes the first apparatus to establish communication with another apparatus different from the second apparatus.

25. The apparatus of claim 19, wherein the image comprises pixel information, the pixel information identifying the source of the communication.

26. The apparatus of claim 25, wherein the image comprises pixel information, the pixel information identifying functionality corresponding to one or more real or soft-coded buttons in the second apparatus.

27. The apparatus of claim 25, wherein the first apparatus comprises one or more images each corresponding to different possible sources of the communication, the one or more images being stored in a database along with corresponding source contact information.

28. A first apparatus comprising:
   means for receiving communication, the communication being directed to a user of the first apparatus;
   means for maintaining characteristic information in the first apparatus regarding a user interface in a second apparatus;
   means for creating an image in the first apparatus based on at least the communication and the characteristic information regarding the user interface in the second apparatus;
   means for creating a message in the first apparatus comprising at least the image; and
   means for sending the message from the first apparatus to the second apparatus via a wireless link for displaying the image on the user interface of the second apparatus.

29. A system comprising:
   a first apparatus configured to communicate via at least one of wired or wireless communication; and
   a second apparatus on which a user interface is to be display, the second apparatus being configured to communicate at least via wireless communication;
   the first apparatus receiving communication, the communication being directed to a user of the first apparatus;
   the first apparatus further maintaining characteristic information regarding a user interface in a second apparatus and creating an image based on at least the communication and the characteristic information regarding the user interface in the second apparatus;
   the first apparatus further creating a message comprising at least the image; and
   the first apparatus further sending the message to the second apparatus via a wireless link for displaying the image on the user interface of the second apparatus.

* * * * *